Nov. 18, 1947.  F. P. BUNDY  2,431,026
MAGNETOSTRICTIVE OSCILLATOR
Filed Jan. 21, 1944
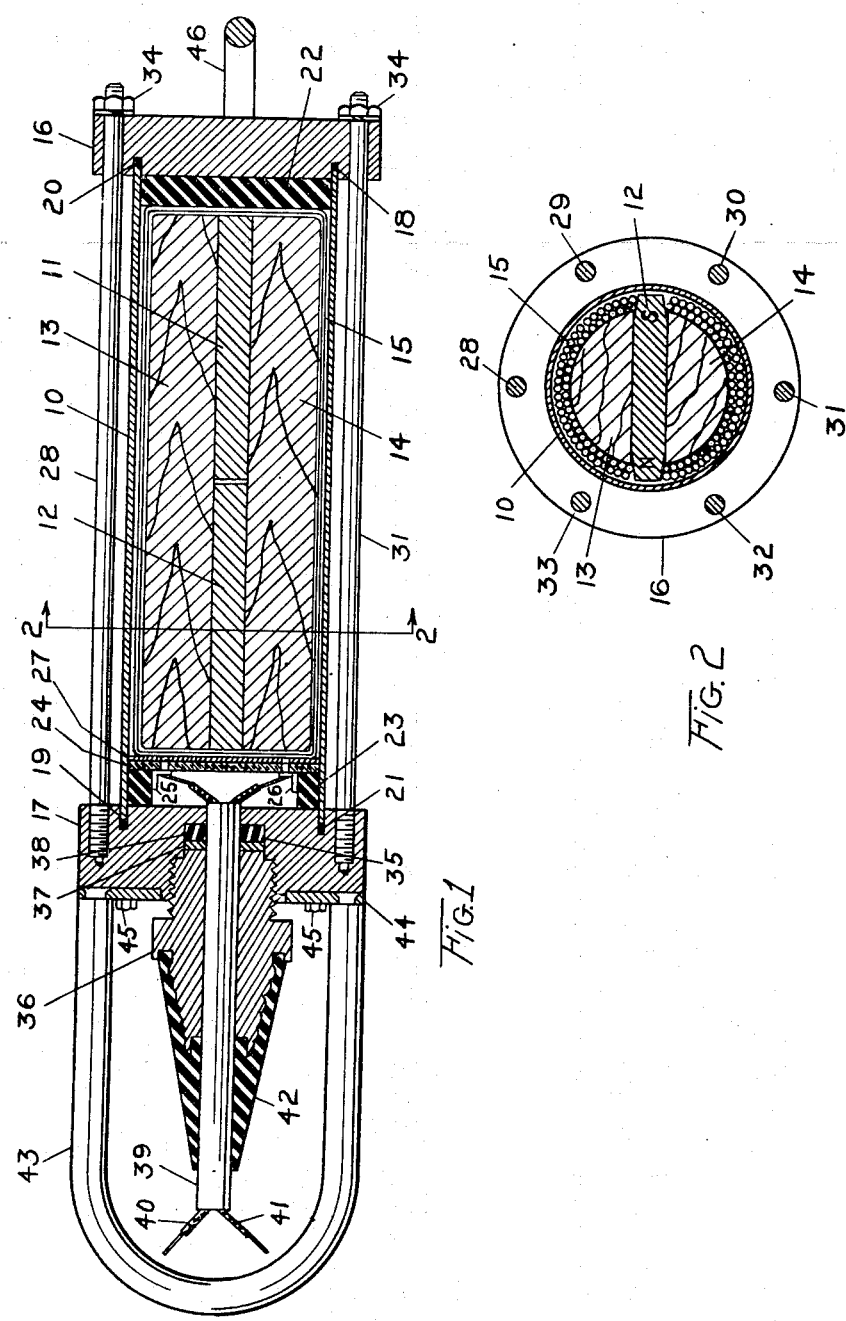
INVENTOR
FRANCIS P. BUNDY
BY
ATTORNEY Patented Nov. 18, 1947

2,431,026

UNITED STATES PATENT OFFICE 2,431,026

MAGNETOSTRICTIVE OSCILLATOR

Francis P. Bundy, Medford, Mass., assignor to the United States of America, as represented by the Secretary of the Navy Application January 21, 1944, Serial No. 519,233

3 Claims. (Cl. 177—386)

This invention relates to a device for converting or translating compressional wave energy of supersonic frequency into electrical energy at such frequency or vice versa. It has particular application to the production and reception of supersonic compressional waves in connection with underwater signalling systems.

More particularly, the invention relates to an improved device of the character described in which the supersonic frequency compressional wave energy is generated by subjecting a magnetostrictive material such as nickel in tubular form to the magnetic field of a coil associated with the tube which field is caused to alternate at supersonic frequency. When this is done, the nickel tube will expand and contract at supersonic frequency along the direction of the lines of magnetic force created by the alternations of the field. This physical expansion and contraction of the nickel tube thus forms the source of supersonic frequency compressional wave energy. When the tube is placed underwater, this energy is projected, through the water medium to a suitable receiver, which may be of similar or different design. When used as a receiver, compressional wave energy striking the nickel tube causes the latter (which is polarized with a magnetic field) to alternately expand and contract, thus changing the flux linkages between this field and the coil associated with the tube to induce an electromotive force in the coil which is then fed into suitable detecting means.

By means of the novel construction of this device which shall be referred to as a magnetostrictive oscillator, the nickel tube can be placed in direct contact with the water since the coil winding is inside of the tube.

Also included inside the tube is a central permanent magnet which serves to polarize the tube, and a pair of substantially semi-cylindrical wooden members which, together with the magnet, form a substantially cylindrical core upon which the coil may be wound. This core sub-assembly which is thus made as a unit can easily be inserted inside the tube.

The mounting for the tube assembly is extremely simple making it easy to service and further includes a pair of yoke members by which the device can be hung over the side of a ship to send or receive compressional waves.

For further understanding of the invention, reference is now made to the accompanying drawings which show a preferred embodiment of the improved oscillator structure.

Fig. 1 is a longitudinal view, mostly in section; and Fig. 2 is a cross sectional view taken along the line 2—2 of Fig. 1.

Referring now to the drawings, the magnetostrictive element of the device in its preferred embodiment is a thin annular nickel shell 10 which is preferably annealed in an air atmosphere.

For permanently polarizing the magnetostrictive shell 10, a pair of permanent magnets 11 and 12 are used. These magnets, which are preferably made from a highly retentive alloy known to the trade as Alnico, are assembled, side by side, their poles being as indicated by the letters N and S in Fig. 2, and the lines of force from magnets 11 and 12 are completed semi-circumferentially in the shell 10.

Two wooden form members 13 and 14 which as seen from Fig. 2 are substantially semi-cylindrical in cross section are disposed adjacent each side of the magnets 11, 12 and a coil winding 15 is applied in two layers.

This sub-assembly consisting of the wooden forms 13, 14, magnets 11, 12 and winding 15 can then be slipped into shell 10. It will be observed the conductors forming the winding 15 lie, for the most part, close to the inner surface of the shell 10. This is done to increase the AC flux linkage with the winding when such flux is created by movement of the magnetostrictive material by a received sound wave train.

Shell 10 is supported by two metallic end members 16 and 17, each of which is provided with annular slots 18 and 19 on their inner faces for receiving opposite ends of the shell 10. Washers 20, 21 of rubber rest at the bottom of each slot to prevent water from entering the interior of shell 10.

A cylindrical cushion pad 22 which may be sponge-rubber is inserted inside shell 10 between winding 15 and end member 16. Similarly, another cylindrical cushion pad 23 occupies the other end of shell 10 and rests against a cylindrical terminal block 24 of insulating material upon which are secured in any suitable manner, a pair of lugs 25, 26. A cylindrical spacer 27 rests between block 24 and the outer end layer of winding 15 and the two ends of winding 15 pass through openings in spacer 27 and are fastened to lugs 25, 26.

Six tie rods 28 to 33 are threaded into end member 17. The other ends of these rods pass through bores in end member 16. Thus as nuts 34 are tightened, end members 16, 17 will be drawn towards each other to slightly compress the cushion pads 22 and 23 and thus provide a cushioned but firm support for the shell and its internal assembly.

For connecting the winding 15 externally, end member 17 has a central bore 35 which is threaded for receiving threaded plug 36. The threaded end of plug 36 is reduced in diameter as shown and this reduced portion presses against a spacer 37 and rubber washer 38 which rests upon an internally shouldered portion of member 17 adjacent bore 35. As plug 36 is threaded tightly into position, washer 38 is compressed and restricted radially into tight surface contact with cable 39 thus preventing water from getting into the shell 10 via the threaded portion of plug 36.

Plug 36 is also provided with a central opening through which is passed cable 39 containing a pair of conductors 40, 41, the latter being connected to lugs 25, 26. A flexible guard sleeve 42 which may be made of rubber surrounds cable 39 and is vulcanized to the other end of plug 36. Guard sleeve 42 serves to prevent too sharp flexing of the cable at its point of emergence from plug 36 and thus reduces the wear on the cable at that point.

A yoke 43 is secured to a plate 44 of horseshoe shape and the latter is fastened to end member 17 by stud bolts 45. At the opposite end, another yoke 46 (only half of which is shown) may be imbedded in end member 16.

The oscillator is lowered into the water by fastening the ship's lead line (not shown) to the two yokes 43 and 46.

In operation of the device as a compressional wave emitter, alternating current of supersonic frequency from a transmitter which may be an electronic oscillator is applied to conductors 40 and 41. The alternating magnetic field due to this current through winding 15 is superposed upon the permanent magnetic field set up by the Alnico magnets 11, 12 and causes shell 10, because of its magnetostrictive characteristic, to expand and contract along the direction of the lines of force of this field which is transverse of the longitudinal axis of shell 10. Therefore, shell 10 expands and contracts radially, at the frequency of the alternating current fed into winding 15 and consequently exerts an alternating pressure at such frequency on the water in which the oscillator is placed.

In operation as a receiver, alternating pressure from compressional wave energy emitted from a remote source acting upon shell 10 causes it to expand and contract. This produces corresponding alternations of the magnetic flux in the shell which thereby induces an alternating current in winding 15 which is then fed into suitable detecting apparatus through conductors 40 and 41.

In conclusion, it will be evident that changes may be made in the particular embodiment of the invention which has been described without departing from the spirit and scope thereof. For example, while permanent magnet means are preferred for polarizing the magnetostrictive shell with a magnet field, the latter may be obtained by other means. One alternate means would be to premagnetize the magnetostrictive shell by passing a large direct current through the coil for a short time. By this means, the shell would remain magnetized for a considerable length of time. However, this method of magnetizing the shell, if used, should be repeated periodically in order that the output of the device will be retained at a maximum level.

Another means for magnetizing the magnetostrictive shell would be to impress a component of direct current upon the coil in addition to the alternating current of supersonic frequency.

Having thus fully described this invention, what is claimed is:

1. In a magnetostrictive oscillator for producing and receiving compressional wave energy, the combination of a cylindrical shell of magnetostrictive material, a permanent magnet disposed within said shell for polarizing the latter, a pair of substantially semicylindrical form members of non-conducting material disposed adjacent the sides of said magnet to form a core of substantially circular cross section and a coil wound upon said core the conductors of which are distributed around the inner surface of said shell and lie parallel with the longitudinal axis thereof.

2. A magnetostrictive oscillator for producing and receiving compressional wave energy comprising a cylindrical shell of magnetostrictive material, a pair of bar magnets disposed within said shell along the longitudinal axis thereof, the poles of said magnets extending longitudinally along opposite sides of said shell to polarize the latter, a pair of substantially semicylindrical wooden form members disposed adjacent the sides of said magnets to form a substantially cylindrical core, a coil wound around said core the conductors of which are distributed around the inner surface of said shell and lie parallel with the longitudinal axis thereof, a pair of end support members each having an annular slot therein for receiving opposite ends of said shell, cylindrical resilient insulating pads interposed respectively between the inner face of each said end member and the end windings of said coil, and means for drawing said end members towards each other to thereby firmly secure said shell therebetween and effect a resilient mounting for the coil wound core within said shell.

3. The combination in claim 2 and further including a conductor cable extending through an aperture in one of said end members to communicate with the interior of said shell whereby the ends of said coil may be connected to the conductors in said cable, and means providing a watertight seal between said end member and cable.

FRANCIS P. BUNDY.

REFERENCES CITED

The following references are of record in the file of this patent:

UNITED STATES PATENTS

| Number | Name | Date |
| --- | --- | --- |
| 1,985,251 | Hayes | Dec. 25, 1934 |
| 2,063,944 | Pierce | Dec. 15, 1936 |
| 2,063,949 | Pierce | Dec. 15, 1936 |
| 2,153,571 | Kallmeyer | Apr. 11, 1939 |

FOREIGN PATENTS

| Number | Country | Date |
| --- | --- | --- |
| 101,140 | Sweden | Mar. 18, 1941 |
| 394,994 | Great Britain | July 5, 1933 |